(12) United States Patent
Alger et al.

(10) Patent No.: US 7,487,766 B2
(45) Date of Patent: Feb. 10, 2009

(54) FLEXIBLE FUEL ENGINES WITH EXHAUST GAS RECIRCULATION FOR IMPROVED ENGINE EFFICIENCY

(75) Inventors: Terrence Francis Alger, San Antonio, TX (US); Barrett Wade Mangold, Atascosa, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 11/738,694

(22) Filed: Apr. 23, 2007

(65) Prior Publication Data

US 2008/0257309 A1    Oct. 23, 2008

(51) Int. Cl.
  F02M 21/00    (2006.01)
  F02M 25/07    (2006.01)
  F02B 47/08    (2006.01)

(52) U.S. Cl. .................. 123/568.14; 123/568.21; 123/431; 123/525

(58) Field of Classification Search ............. 123/431, 123/27 GE, 525, 526, 527, 568.11, 568.14, 123/575, 1 A, 198 A, 568.12, 568.21
See application file for complete search history.

(56) References Cited

U.S. PATENT DOCUMENTS

| | | | | |
|---|---|---|---|---|
| 4,548,187 A | | 10/1985 | Olsson et al. ............... 123/557 |
| 5,188,087 A | * | 2/1993 | Saito ...................... 123/568.21 |
| 5,271,370 A | * | 12/1993 | Shimada et al. ........... 123/25 A |
| 6,637,382 B1 | * | 10/2003 | Brehob et al. ............... 123/25 J |
| 6,655,324 B2 | * | 12/2003 | Cohn et al. .................. 123/1 A |
| 6,687,597 B2 | | 2/2004 | Sulatisky et al. ............ 701/104 |
| 6,820,597 B1 | | 11/2004 | Cullen et al. ................. 123/520 |
| 6,862,919 B2 | | 3/2005 | Lin et al. .................... 73/53.01 |
| 6,880,392 B2 | | 4/2005 | Lee et al. .................... 73/118.1 |
| 6,907,870 B2 | | 6/2005 | zur Loye et al. ............ 123/594 |
| 6,948,475 B1 | | 9/2005 | Wong et al. .................. 123/299 |
| 7,121,254 B2 | * | 10/2006 | Wickman et al. ........... 123/304 |
| 7,134,420 B2 | * | 11/2006 | Miyashita .................... 123/299 |
| 7,178,503 B1 | * | 2/2007 | Brehob ........................ 123/304 |
| 7,284,506 B1 | * | 10/2007 | Sun et al. ..................... 123/1 A |
| 7,305,939 B2 | * | 12/2007 | Carlson .................. 123/27 GE |
| 2006/0102136 A1 | | 5/2006 | Bromberg et al. ........... 123/198 |
| 2006/0102145 A1 | | 5/2006 | Cohn et al. ............. 123/406.29 |

FOREIGN PATENT DOCUMENTS

WO    81/00739 A1    3/1981

* cited by examiner

*Primary Examiner*—Hai H Huynh
(74) *Attorney, Agent, or Firm*—Baker Botts L.L.P.

(57) ABSTRACT

A method and system for use with flexible fuel engines capable of operating with arbitrary mixtures of gasoline and alternative fuel. The engine is equipped with an EGR loop and a control system, such that, as the relative amount of alternative fuel decreases, the amount of EGR provided to the engine increases.

15 Claims, 1 Drawing Sheet

FLEXIBLE FUEL ENGINES WITH EXHAUST GAS RECIRCULATION FOR IMPROVED ENGINE EFFICIENCY

TECHNICAL FIELD OF THE INVENTION

This invention relates to automotive engine systems, and more particularly to dual-fuel engines.

BACKGROUND OF THE INVENTION

A flexible-fuel vehicle (FFV) vehicle is a vehicle that can alternate between two or more sources of fuel. A common example is a vehicle that can accept gasoline mixed with varying levels of bioethanol (gasohol). As another example, some vehicles carry a natural gas tank, and can switch from gasoline to natural gas. The natural gas is stored as either compressed natural gas (CNG) or liquefied natural gas (LNG). Vehicles designed to run on either of two fuels are also referred to as "dual fuel" vehicles.

In North America, vehicles from approximately 1980 onward can run on 10% ethanol and 90% gasoline (referred to as E10 fuel) with no modifications. To use more than 10% ethanol, a vehicle generally requires special engineering. In the United States, many flexible-fuel vehicles can accept up to 85% ethanol (E85) or up to 85% methanol (M85).

As of the last several years, most existing vehicles that are available to the public with flex-fuel engines are sport-utility vehicles or others in the "light truck" class. Sedans, wagons, and others are usually only available in flexible-fuel configurations as part of fleet vehicle purchases. In the near future, more widespread availability is planned for standard models.

Flexible-fuel vehicles are in wider use abroad. For example, since the oil crisis in the 70's, Brazil has been selling ethanol as an automotive fuel. Cars in Brazil can run with arbitrary combinations of gasoline and alcohol (up to 100% of alcohol), but cannot use pure gasoline—they are optimally designed to run on gasoline mixed with 20% to 25% of ethanol. In European countries, there are also plans of selling E85 fuel as well as flexible-fuel vehicles.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

For purposes of this description, the term "flexible fuel" vehicles refer to vehicles that use a mixture of gasoline and an alternative fuel. As stated in the Background, such vehicles have been available for years, particularly in countries having an abundance of alternative fuel, such as in the case of ethanol in Brazil.

A continuing challenge with flexible fuel vehicles is achieving the ability of the engine to run on fuels having an arbitrary mixture, that is, a fuel mixture that could be 100% gasoline, 100% of the alternative fuel, or any arbitrary ratio of gasoline and the alternative fuel.

Various sensors and controllers have been developed to permit an engine to cope with changing fuel mixtures. These sensors, together with a properly programmed engine control unit (ECU), deal with the effect of varying dual fuel mixtures on engine variables such as A/F ratio, injector timing, spark timing, manifold pressure, and torque.

A feature of the invention described herein is the recognition and exploitation of the greater engine knock resistance of alternative fuels. "Alternative fuels" as used herein may include without limitation the following: ethanol, methanol, LPG, NG, and hydrogen. Most alternative fuels have a greater knock resistance than gasoline. Thus, when an engine is using a higher amount of alternative fuel relative to gasoline, the engine is more resistant to knock and it should be possible to run the engine at a higher compression ratio. The result is significant fuel economy.

However, for times when the alternative fuel is not being consumed or is being consumed in some lesser proportion, the engine must be capable of operating with gasoline despite the lower knock resistance of gasoline. As explained below, during these conditions, exhaust gas recirculation (EGR) is used to mitigate knock.

Figure 1:
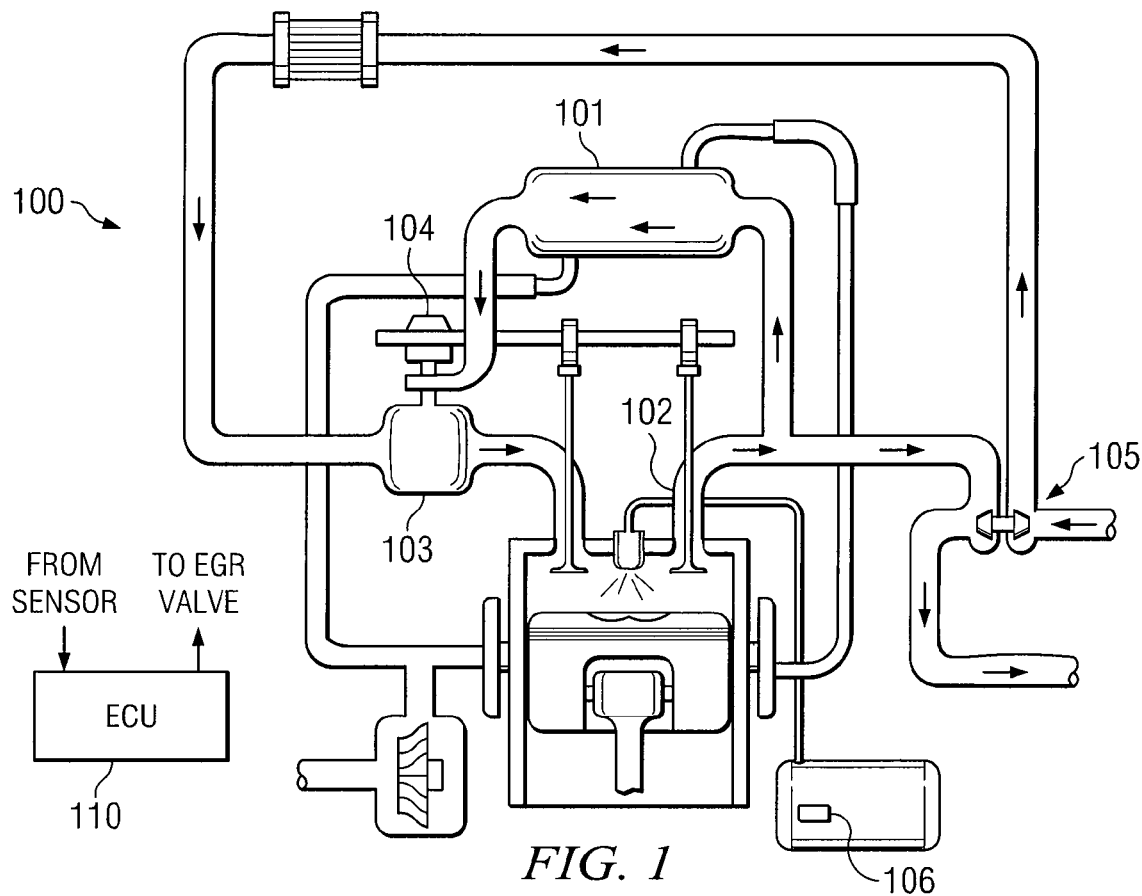
FIG. 1 illustrates an internal combustion engine having an external EGR loop and dual-fuel engine control in accordance with the invention.

FIG. 1 illustrates an internal combustion engine 100 having an EGR loop 101. In the example of FIG. 1, engine 100 is a spark-ignited flexible fuel engine.

Exhaust gas recirculation (EGR) was developed as a NOx (nitrogen oxide and nitrogen dioxide) reduction technique, and works by recirculating a portion of the engine's exhaust gas from the exhaust manifold 102 back to the intake manifold 103. Intermixing the incoming air with recirculated exhaust gas dilutes the mix with inert gas, lowering the peak combustion temperature. Because NOx formation progresses much faster at high temperatures, EGR limits the generation of NOx.

The EGR path of FIG. 1 implements "external EGR", by piping a path from the exhaust manifold 102 to the intake manifold 103. An EGR control valve 104 within the EGR path regulates and times the EGR gas flow. An EGR cooler cools the exhaust gas in the EGR loop before it enters the intake manifold 103.

In the example of FIG. 1, EGR is used with a turbocharger 105, which builds backpressure in the exhaust manifold. For EGR to flow, a pressure difference is required across the intake and exhaust manifolds, and this pressure difference is created by the turbocharger.

Engine 100 may be designed to run optimally with the highest expected proportion of alternative fuel, that is, with a high compression ratio. The proportion of alternative fuel may be as much as 100%, with engine 100 being designed for use with that fuel. However, because of the EGR control as described herein, engine 100 also runs efficiently with arbitrary fuel mixtures or with 100% gasoline. When engine is running with less than 100% of the alternative fuel, EGR is used to reduce any knock tendency of the engine. Other engine parameters, such as intake valve closing timing, can be used with the EGR, to further improve engine performance affected by a reduced proportion of the alternative fuel.

As an example, in today's conventional automobiles, the range of typical compression ratios is 10:1 to 11:1. However, engines burning E85 (85% ethanol and 15% gasoline) can be run at compression ratios higher than this range.

In this example, engine 100 is optimized for operation using E85, with a compression ratio higher than 10:1. However, engine 100 is also capable of operation with fuels ranging from E85 to E0 (pure gasoline).

One or more sensors 106 may be used to automatically detect the fuel mixture. Such sensors are commercially available, and one example of such as sensor is a type placed in the fuel tank. Sensor 106 communicates the fuel proportion to control unit 110.

When sensor 106 detects that the engine is fueled with E85, the control unit 110 provides a signal to EGR valve 104 to control the EGR flow rate to be low or zero. If the driver refuels with gasoline, changing the fuel proportion, sensor 106 detects the new fuel proportion and delivers a signal to control unit 110, which increases the EGR percentage to reduce the knock tendency of the engine.

Engine control unit 110 may be a separate unit responsive to fuel mixtures in accordance with the invention, or its functionality may be integrated with a more comprehensive engine control unit that control many other parameters of engine 100. In any event, engine control unit 110 receives signals representing the current fuel mixture from sensor 106. It delivers control signals to EGR valve 104 and any other actuators or controllers that may be affected by the fuel mixture. Control unit 110 may be implemented with appropriate hardware and software.

Figure 2:
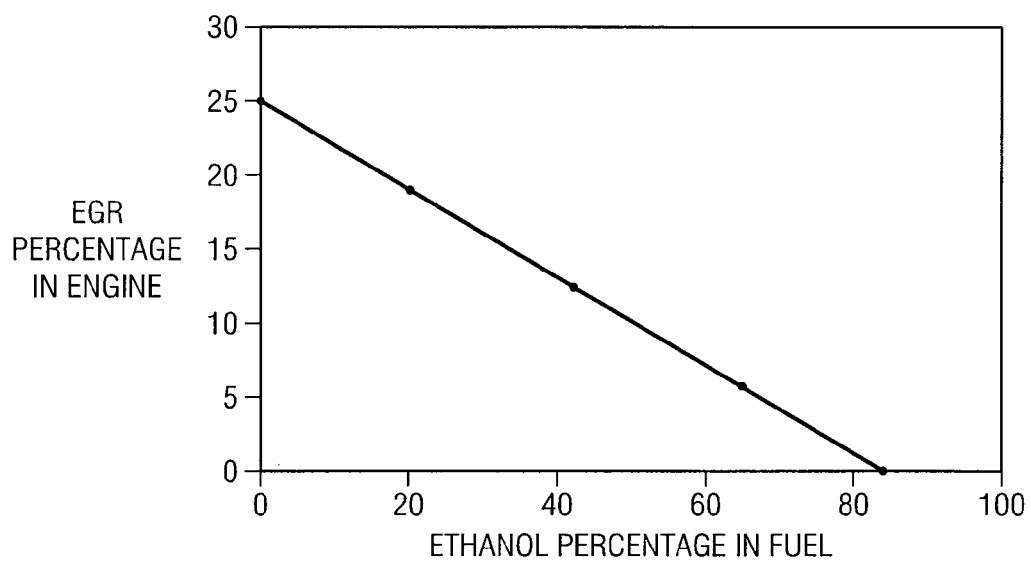
FIG. 2 illustrates an example of the relationship between the amount of alternative fuel in the fuel mixture and the amount of EGR provided to the engine.

FIG. 2 illustrates an example of EGR percent control for engine 100, as implemented by programming of control unit 110. As indicated, as the percentage of alternative fuel (for example ethanol) increases, the amount of EGR provided to the engine decreases. FIG. 2 is an example; the relationship need not be linear, and control unit 110 may be programmed with any appropriate algorithm or look-up table to determine the amount of EGR in response to the fuel mixture.

Because EGR uses a percentage of the fresh charge and reduces volumetric efficiency, engine 100 is boosted to compensate for that change. The air handling system is sized to provide a minimum amount of airflow when running gasoline, so that minimum torque requirements can be met. Boosting of the engine will also enable the engine to be downsized, which also benefits knock resistance.

If engine 100 has less tolerance for EGR than is required to eliminate knock, a limited variable valve system could be used to reduce temperature at cylinder TDC (top dead center). Specifically, a Miller cycle system could be used, which uses a late intake valve closing to reduce temperature at TDC and relies on boost to keep the mass airflow constant. In this case, EGR is the primary knock reduction mechanism but the variable IVC (inlet valve closing, e.g., the angle where the inlet valve is closed) assists in reducing knock especially when running low amounts of the alternative fuel.

As indicated above, an advantage of the invention is that the engine compression ratio can be optimized for alternative fuels, that is, at a more knock resistant condition than is available when the engine is running gasoline. This engine design will promote the use of alternative fuels by providing fuel consumption and power benefits to persons using a high percentage of alternative fuel. At the same time, persons using little or no alternative fuel will not suffer from poor engine performance.

What is claimed is:

1. A method of operating an internal combustion engine for use with arbitrary fuel mixtures that contain relative proportions (ratios) of gasoline and at least one alternative fuel, the engine having an exhaust gas recirculation system, an engine control unit, and a fuel mixture sensor, comprising:

for each value of a number of the ratios, determining a recirculated exhaust gas value, based at least in part on knock characteristics of the engine when operating with that relative proportion;

storing a set of fuel-responsive recirculated exhaust gas values, each value associated with a ratio;

using the fuel mixture sensor to deliver a signal to the engine control unit that represents the ratio in the fuel mixture currently being supplied to the engine;

determining whether the ratio in the fuel mixture currently being supplied to the engine has changed;

if the ratio has changed, using the engine control unit to access fuel-responsive recirculated exhaust gas values and to use these values to control the amount of recirculated exhaust gas to deliver to the engine; and maintaining the current amount of fuel-responsive recirculated exhaust gas until the ratio again changes;

determining whether the ratio reveals that the proportion of alternative fuel is below a predetermined minimum proportion; and if the proportion of alternative fuel is below the predetermined minimum proportion, adjusting the valve timing to reduce cylinder temperature.

2. The method of claim 1, further comprising using the turbocharger to boost air intake when the amount of recirculated exhaust gas being provided to the engine exceeds a certain amount.

3. The method of claim 1, further comprising cooling the recirculated exhaust gas before it reaches the engine.

4. The method of claim 1, wherein the recirculated exhaust gas is provided via a loop from the exhaust manifold to the intake manifold.

5. The method of claim 1, wherein the engine is a spark ignited engine.

6. The method of claim 1, wherein the step of adjusting the valve timing is performed by using a late intake valve closing.

7. The method of claim 1, wherein alternative fuel has a maximum proportion, and further comprising the step of optimizing the compression ratio of the engine for the maximum proportion.

8. The method of claim 1, wherein the engine operates stoichiometrically or substantially stoichiometrically.

9. An exhaust gas recirculation control system for an EGR-equipped flexible-fuel internal combustion engine system, the engine being fueled by a mixture of gasoline and an alternative fuel whose relative proportions change only in response to refueling, the control system comprising:

a sensing unit for sensing the relative proportion of alternative fuel currently being supplied to the engine;

memory for storing a set of fuel-responsive recirculated exhaust gas values, each value associated with a relative proportion of the alternative fuel;

a control unit configured to receive values representing the amount of alternative fuel from the sensing unit, to access the memory, and to generate an EGR control signal for controlling the amount of EGR to be delivered to the engine;

an EGR valve for receiving the EGR control signal from the control unit and for controlling the amount of EGR delivered to the engine; and a turbocharger, wherein the control unit is further configured to generate a boost air control signal for controlling the output of the turbocharger in response to the amount of EGR delivered to the engine.

10. The system of claim 9, wherein the recirculated exhaust gas is provided via a loop from the exhaust manifold to the intake manifold.

11. The system of claim 9, wherein the engine is a spark ignited engine.

12. The system of claim 9, wherein alternative fuel has a maximum proportion, wherein the engine compression ratio is optimized for the maximum proportion.

13. The system of claim 9, wherein the engine operates stoichiometrically or substantially stoichiometrically.

14. The system of claim 9, whether the control unit is further operable to determine whether the relative proportions reveal that the proportion of alternative fuel is below a predetermined minimum proportion, and if the proportion of alternative fuel is below the predetermined minimum proportion, to deliver a control signal to adjust the valve timing to reduce cylinder temperature.

15. The system of claim 14, wherein the valve timing is adjusted by adjusting the intake valve closing timing.

* * * * *